United States Patent

[11] 3,590,208

[72] Inventors Paul Martini
Sandkrug;
Gotz Mrowka, Oldenburg; Heinz-Hermann Hasche, Oldenburg, all of, Germany
[21] Appl. No. 773,133
[22] Filed Nov. 4, 1968
[45] Patented June 29, 1971
[73] Assignee Licentia Patent-Verwaltungs-G.m.b.H. Frandfurt am Main, Germany
[32] Priority Nov. 2, 1967, Jan. 5, 1968
[33] Germany
[31] P 16 13 282.4 and P 16 38 223.3

[54] METHOD OF ALIGNING AND WELDING LAMINATED SHEETS FOR ELECTRICAL MACHINES
13 Claims, 9 Drawing Figs.

[52] U.S. Cl. .................................................. 219/92, 310/268
[51] Int. Cl. ................................................ B23k 11/26
[50] Field of Search .......................................... 219/92, 117, 113, 86; 29/598, 619

[56] References Cited
UNITED STATES PATENTS

| 2,507,022 | 5/1950 | Languepin ............... | 219/113 |
| 3,012,167 | 12/1961 | Rediger .................. | 310/259 |
| 3,202,851 | 8/1965 | Zimmerle et al. ........ | 29/609 UX |
| 3,203,077 | 8/1965 | Zimmerle ................ | 29/598 |

Primary Examiner—J. V. Truhe
Assistant Examiner—J. G. Smith
Attorney—Spencer & Kaye ABSTRACT: A method for producing a stack of laminations for the rotor or stator of an electrical machine. The method involves stamping a number of laminations to form projections and recesses at points around a circle. Each projection is formed in mating configuration with one of the recesses but displaced in the circumferential direction around the circle with respect thereto. The individual laminations are then stacked so that the projections of one lamination engage a recess of an adjacent lamination. Each lamination will then be angularly displaced, about the common axis formed by all of the circles, with respect to its adjacent laminations. The laminations are then welded together, preferably by a projection welding process.

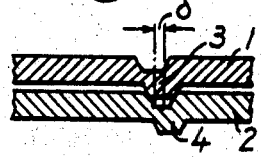
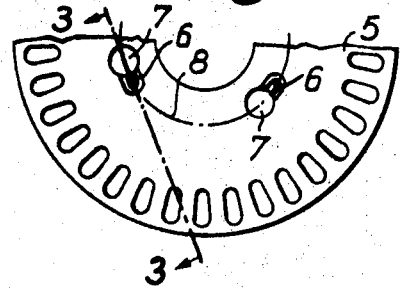
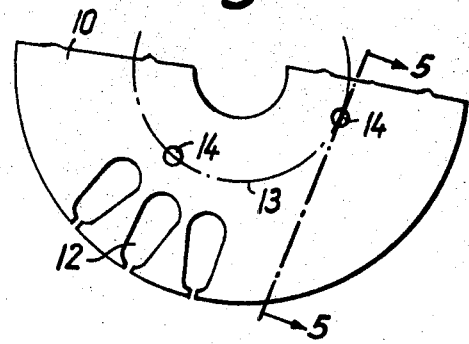
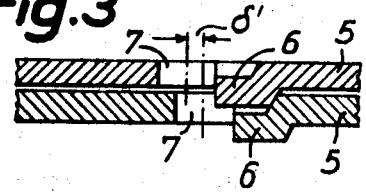
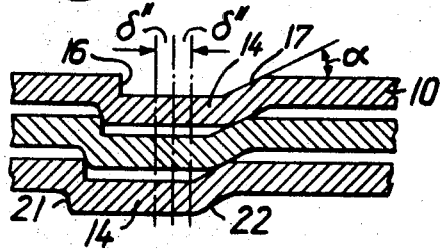
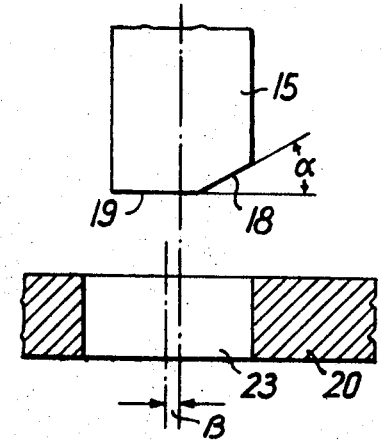
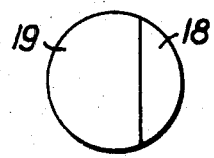
Inventors:
Paul Martini
Götz Mrowka
Heinz-Hermann Hasche
By: Spencer & Kaye
Attorneys

METHOD OF ALIGNING AND WELDING LAMINATED SHEETS FOR ELECTRICAL MACHINES

BACKGROUND OF THE INVENTION

The present invention relates to a method for producing a stack of laminations for the rotor or stator of an electrical machine by means of "projection welding." In the projection welding process individual laminations are stamped to provide welding projections, placed one on top of the other and electrically welded together to form a solid stack or packet.

With the projection welding process which is presently known (and described, for example, in the German Pat. No. 847,037 and the German Utility Model Pat. No. 1,908,662) the individual sheets of laminations must be stacked stacked with each sheet neither shifted nor rotated with respect to its adjacent sheets. As a result, any slots which are located in the finished lamination packet will extend parallel to the central axis of the packet. In the past, it has not been possible to employ the projection welding process to manufacture a lamination packet of the type frequently used, for example, with a squirrel-cage rotor; namely, a packet having slots which extend through the laminations at an angle to its central axis.

SUMMARY OF THE INVENTION

An object of the present invention, therefore, is to find a method which will adapt the projection welding process to the manufacture of a stack of laminations with inclined slots.

This object, as well as other objects which will become apparent in the discussion that follows, is achieved, according to the present invention, by stamping a number of laminations to form projections and recesses at points around a circle. Each projection is formed in mating configuration with one of the recesses but is displaced in the circumferential direction around the circle with respect thereto. The individual laminations are then stacked so that the projections of one lamination engage a recess in the adjacent lamination. As a consequence, each lamination will be angularly displaced, about the common axis formed by all of the circles on the individual laminations, with respect to its adjacent laminations.

Thereafter the stacked laminations can be welded in the usual way by passing a current through them from one end lamination to the other. Since the individual laminations are separated by the weld projections, all the current will be constrained to flow through these projections, causing them to melt and fuse the laminations together.

If, in the method according to the present invention, the individual laminations are provided with holes in identical locations, the resulting stack of welded laminations will exhibit a corresponding number of slots. Because of the angular displacement between successive laminations, these slots will extend through the stack in a helix at a prescribed incline with respect to the common axis of the stack.

BRIEF DESCRIPTION OF THE DRAWINGS

FIG. 1 is a cross-sectional view through two adjacent metal laminations, showing two adjacent weld projections which were made according to one preferred embodiment of the present invention.

FIG. 2 is a top view of a portion of a metal lamination showing two semicircular weld projections according to a second preferred embodiment of the method of the present invention.

FIG. 3 is a cross-sectional view through two adjacent laminations taken along the line 3–3 of FIG. 2.

FIG. 4 is a top view of a portion of a metal lamination having two circular weld projections produced according to a third preferred embodiment of the method of the present invention.

FIG. 5 is a cross-sectional view through three adjacent laminations taken along the line 5–5 of FIG. 4.

FIG. 6 is a side view of the stamping die and a cross-sectional view through its associated bottom die which stamping die and bottom die are used to produce the weld projections of FIGS. 4 and 5.

FIG. 7 is an end view of the working surface of the stamping die of FIG. 6.

DESCRIPTION OF THE PREFERRED EMBODIMENTS

Figure 8:
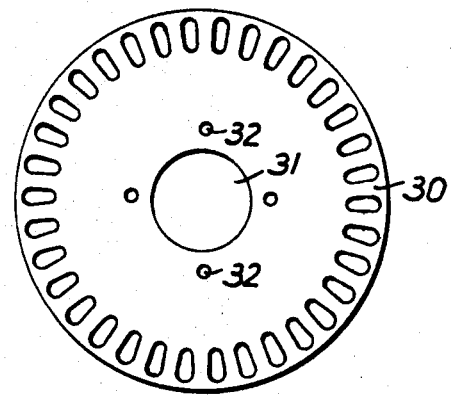
FIG. 8 is a top view of a rotor lamination having weld projections arranged according to a particular feature of the present invention.

Referring now to the drawing, FIG. 1 provides an enlarged illustration of a section through two adjacent laminations 1 and 2. Each lamination is stamped to impart a plurality of weld projections, such as projections 3 and 4, arranged at equidistant points around a common circle.

The weld projections shown in FIG. 1 are preferably made with a cylindrical stamping die having a conical tip. The lamination to be stamped is supported by a bottom die having a conical recess similar in shape to the conical tip of the stamping die. The stamp of impression in the lamination is then made in the usual way except that the stamping die is rotated with respect to the bottom die about the central axis of the common circle noted above so that the weld projections 3 or 4 are shifted sideways with respect to their corresponding indentations or recesses by a particular angular value δ.

When the laminations which have been stamped in this manner are arranged in layers, the weld projections of one lamination will be inserted in the corresponding indentations or recesses of the lamination below. The displacement between the weld projections and the recesses about their common central axis will therefore cause a corresponding rotational shift between respective laminations about their central axis. If the laminations are provided with grooves or slots, these too will form an incline with the central axis of the stack of laminations. The value of the angle δ between the weld projection and the recesses is determined by the number of laminations in a stack and the amount of slot inclination desired. For example, if a slot inclination of 10 mm. is required with a stack of 40 laminations, each welded pair of laminations should be angularly displaced approximately 0.25 mm.

After the laminations have been stamped and arranged in layers to form a stack or packet, they may be welded in the usual way by passing an electric current through the projections.

When constructing a packet of laminations, it was previously necessary to use a plurality of rods or needles to temporarily fix the inclination of the slots. The projection welding method according to the present invention makes the use of these rods unnecessary. Provided that care is taken to insure that, as the laminations are stacked, they are always in the same relative orientation as they were when stamped, the resulting lamination packet as well as the inclination of the slots will be absolutely uniform. The weld projections of the individual laminations which were formed by the same stamping and bottom die will then always lie one over the other so that the unavoidable variations in the projections will have effect at one place only and will not be added.

The method according to the present invention is especially suited for a fully automated production machine which takes a prescribed number of laminations from a supply stack after stamping, check-weighs them and, without inserting a layer-forming spindle, introduces them into the welding apparatus. In the welding apparatus it is only necessary to provide an external guide for the stack of laminations, preferably by means of ceramic groove guides. Because the necessary inclination will be imparted to the slots in the lamination packet as the laminations themselves are stacked, all the incidental operations which were required in the prior art are rendered unnecessary and it is possible to cut the working time, as compared to the prior art methods, by 50 percent.

FIGS. 2 and 3 illustrate a modified embodiment of the method according to the present invention for imparting an inclination to the slots of a projection welded stack of laminations.

FIG. 2 shows an individual rotor lamination 5 in top view having a plurality of semicircular weld projections 6 arranged around a common circle 8. As in the case of the embodiment of FIG. 1, the weld projections 6 are impressed by a conically tapered stamping die. A plurality of holes 7 are also stamped in the lamination on the same side of each weld projection 6, when viewed in the circumferential direction of the circle 8. These holes 7 serve to cut off part of each of the weld projections 6 so that the individual laminations will have an angular displacement with respect to each other when stacked to form the lamination packet. Depending on the size and position of this hole 7, it is possible to impart the desired inclination to the slots of the packet. As may be seen in FIG. 3, the angular value $\delta'$ may be freely adjusted between certain limits which are determined by the diameter of the holes 7.

In order to achieve a uniform slot inclination when stacking, it is necessary, in this case, to temporarily fix the inclination by inserting rods in the slots. This is because each welding projection 6 lies with only one side against the corresponding indentation or recess of the adjacent lamination. Without the rod it would be easy for the laminations to become angularly displaced with respect to each other, causing the inclination of the slots to vary.

After the individual laminations have been stamped, the stack of laminations is produced by removing a prescribed number of laminations from a supply stack, check-weighing these and inserting rods into the slots to determine the degree of inclination. The packet which is prepared in this way is then inserted in the laminating apparatus and lightly pressed together. Finally, the rods are removed again, in order to eliminate any current paths which would short circuit the weld projections and the packet is welded in the usual manner by passing current from one end face of the stack to the other.

FIGS. 4 through 7 illustrate a still further embodiment of the method according to the present invention. This embodiment eliminates the requirement for the position-fixing rods even with slot inclination angles of greater than 30°. With this embodiment the individual laminations will automatically orient themselves with respect to each other when stacked to form a packet.

FIG. 4 shows, in top view, a portion of a lamination 10 of the rotor of an electrical machine. This lamination 10 may, for example, be provided with the openings 12 which form slots in the rotor when a plurality of such laminations are stacked. The lamination 10 is also stamped with a plurality of weld projections 14 arranged at regular intervals around a common circle 13.

FIG. 5, which is a greatly enlarged view of a cross section taken along the line 5-5 of FIG. 4, shows how the weld projections 14 produce an angular shift between successively stacked laminations 10. Because of the special shape of the stamping die 15, the recesses in the laminations 10, when viewed in section, are all provided with an edge 16 which is perpendicular and an edge 17 which inclines at a sharp angle to the plane of the laminations. The external edges of the weld projection 14, also in the section 5-5, likewise exhibit an approximately perpendicular edge 21 and a correspondingly inclined edge 22. These edges 21 and 22 closely follow the configuration of the respective edges 16 and 17 because the gauge of the sheet iron which is used for the laminations is small (preferably 0.5 mm. in thickness) and because of the shape of the bottom die 20.

The stamping die 15 is shown in side view in FIG. 6; its stamping surface 19 is shown in end view in FIG. 7. The die is circular in cross section. A section 18 of its circular stamping surface 19 is beveled at an angle $\alpha$ with respect to the plane of the remainder of the surface 19. When this stamping die 15 is impressed in the lamination 10, it thus forms a circular recess, approximately half of which exhibits the perpendicular edge 16. The section 18 of the stamping surface which is beveled at the angle $\alpha$ forms the inclined edge 17.

The bottom die 20 shown in FIG. 6 is provided with a circular hole 23 having vertical edges. The central axis of the hole 23 is displaced about the common circle 13 by an angle $\beta$ with respect to the central axis of the stamping die 15. According to the thickness of the lamination to be stamped, the diameter of the hole 23 of the bottom die 20 is made approximately 10—20 percent larger than the diameter of the stamping die 15. Thus, depending on the properties of the lamination material, when a lamination is stamped between the dies 15 and 20, a nearly perpendicular edge 21 will be imparted to the weld projection 14 for approximately half of its circumference and the inclined edge 22 will be formed beneath the beveled edge 18 of the stamping die 15.

The laminations 10 are stacked in layers, as shown in FIG. 5, so that their weld projections 14 will lie one above the other. As a result, the individual laminations 10 will be in contact only at their weld projections 14; that is, each two adjacent laminations will be spaced a prescribed distance apart which depends upon the height of these projections. This spacing is an absolute necessity for the subsequent welding process since the welding current will then be constrained to flow through the projections 14 and cause these projections to melt. During the welding process the stack of laminations is pressed together down to its final width.

The shape of the weld projections 14 is such that the edges 21 will rest against the edges 16 and the edges 22 will rest against the edges 17. The inclination of the slots in the stack of laminations is therefore imparted by the matching edges 17 and 22 which are formed with an angle $\alpha$ with respect to the plane of the laminations by the beveled surface 18 of the stamping die 15. When the laminations ate stacked, the individual sheets 10 will be oriented, as a result of the difference between the configuration of the edges 16, 17 and the edges 21, 22, in such a way that the central axes of the weld projections 14 of two adjacent sheets will be shifted by a prescribed amount about the central axis formed by the circles 13. The vertical construction of the edges 16 and 21 ensures that the position of the individual laminations will be fixed, after stacking, so that they can no longer rotate with respect to each other.

As may be seen in FIG. 5, each two adjacent laminations are angularly displaced by an angle $\alpha''$ about the central axis of the circles 13. This angle $\alpha''$ is dependent upon the angle of inclination $\alpha$ of the edges 17 and 22 and, in turn, determines the degree of inclination of the slots in the lamination packet which are formed by the openings 12 in the individual laminations.

The slot inclination is also dependent upon certain other parameters of the stamping die and the bottom die. In addition to changing the angle $\alpha$, it is also possible, for example, to vary the depth of impression of the stamping die in the laminations, the angle $\beta$, the size of the circular section 18 and the diameters of the stamping die and the bottom die. These parameters may be determined empirically so that, depending on the properties of the material and the shape of the individual laminations, both the desired slot inclination and a proper weld may be achieved. It is of advantage, however, not to make the angle $\beta$ so large that the linear displacement between the central axes of the stamping die and the bottom die will be greater than the thickness of the laminations.

When producing lamination packets for small electric motors with sheet iron which is 0.5 mm. thick, the method according to the present invention may be advantageously carried out with a stamping die 15 and a bottom die 20 of the following dimensions:

Diameter of the stamping die 15=2.6 mm., diameter of the hole 23 in the bottom die 20=3.0 mm.;

displacement between the central axes of the stamping die 15 and the hole 23=0.25 mm.;

the angle $\alpha$ of the stamping die 15=28°.

If these dimensions are used, the slots in the stack of laminations will be inclined at an angle of 35° with respect to the central axis of the stack.

Extreme care should be taken during the welding process to ensure that the weld if of the highest quality. In the case of all the various weld projection embodiments described above, it has proven advantageous to employ the capacitor-pulse-type welding process. Because of the extremely short duration of the current pulse used with this welding process, the workpiece will be heated to only a slight extent outside of the points that are actually welded. As a result, it is impossible to obtain a strong weld without warping the stack even when the stack is formed of thin laminations. Even the end or outside sheets will be properly fastened to the stack of laminations. It should be noted that capacitor-pulse welding machines provide the additional advantages of being less expensive, since they do not require the added expense of welding transformers, and of applying only a small load to the mains supply.

The above-described embodiment of the method according to the present invention has the advantage, on one hand, of providing a sure means of centering the laminations and, on the other, of providing a way of varying the inclination of the lamination slots at will. The latter advantage is accomplished mainly by changing the angle $\alpha$ of the stamping die; i.e., by simply exchanging one die for another. An additional advantage of this method is that it permits the slots to be inclined at a greater angle, especially with lamination stacks which are relatively thick, than was possible in the past, with the apparatus and auxiliary equipment which was usually employed. The method can be employed without difficulty to construct stacks of laminations of any desired length.

Finally, the method according to the present invention eliminates the requirement for the rods which were used in the past to fix the inclination of the slots. Since these rods had a tendency to bind in the slots as a result of the helical twist of the grooves about the axis of the stack of laminations, it was necessary, in some cases, to produce the stack in separate sections. In short, it is possible to carry out the method according to the present invention without using any additional equipment such as stacking spindles or fixing rods either during the stacking or during the welding process.

If it is necessary to anneal the laminations, this procedure can be carried out after the lamination stack has been welded. Since the laminations are tightly held together, there is then no longer any possibility that they can scale or warp.

If it is desired to impress the weld projections in laminations which have a high silicon content, it has proven advantageous to manufacture the stamping die of a dry powdered metal.

Figure 9:
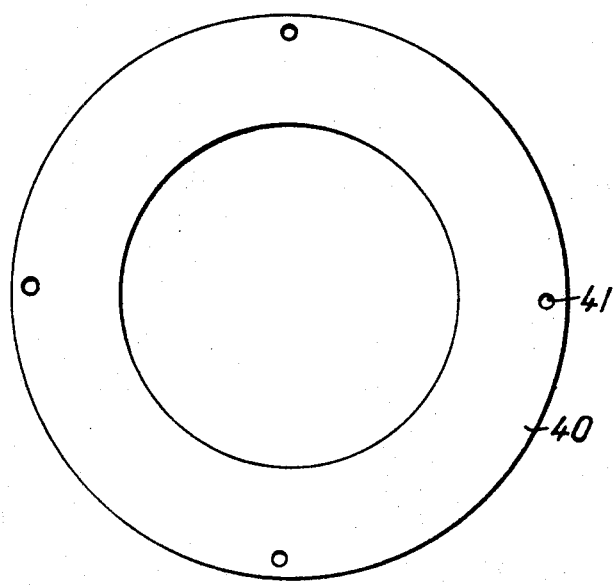
FIG. 9 is a top view of a stator lamination having weld projections arranged according to another particular feature of the present invention.

FIGS. 8 and 9 illustrate preferred arrangements of the weld projections on laminations designed for a rotor (FIG. 8) and a stator (FIG. 9). The rotor lamination 30 is provided with a hole 31 at the center for the rotor shaft, while the stator lamination 40 is sufficiently large to surround the rotor. According to the present invention, the weld projections 32 of the rotor lamination 30 lie on a circle immediately adjacent to the rotor shaft hole, while the weld projections 41 of the stator lamination 40 lie immediately adjacent to its outer circumference. This arrangement has the advantage that the connection of the laminations is arranged on a place where the magnetic flow is small.

It is advantageous if the weld projections are produced at the same time that the laminations are stamped from a larger sheet of material. The stacking of the individual laminations may be advantageously accomplished by removing a prescribed number of sheets from the discharge trough of the stamping machine—where the sheets have already oriented themselves into their final position as a result of the shape of the weld projections—and, without changing the relative positions of the individual laminations, straightening the stack and feeding it to the welding machine for further processing.

It will be understood that the above description of the present invention is susceptible to various modifications, changes and adaptations.

We claim:

1. In a method for producing a stack of laminations for an electrical machine the improvement comprising the steps of:

a. stamping a plurality of laminations at corresponding points around a circle to form at least one projection and recess in each lamination which are of mating configuration, extend in the direction of the axis of said circle, and have corresponding edges which are angularly displaced in the circumferential direction of said circle;

b. stacking said plurality of laminations with the projections of one lamination engaging a recess of an adjacent lamination, so that the corresponding engaging edges of the projection and the recess of adjacent laminations causes each of said laminations to assume a position which is angularly displaced, about the common axis formed by all of said circles, with respect to each adjacent lamination; and c. welding said plurality of laminations together.

2. The improvement defined in claim 1, wherein said stamping step includes the steps of arranging each one of said laminations on bottom die means having a recess located at least one point around said circle and stamping said one lamination with stamping die means at at least one point around said circle, said at least one point of said recess of said bottom die means being angularly displaced about the axis of said circle with respect to said at least one point of said stamping means.

3. The improvement defined in claim 1, wherein each of said laminations has at least one opening, in consequence of which the stack of laminations has at least one slot which is inclined with respect to said common axis.

4. The improvement defined in claim 1, wherein each of said at least one projection and recess are semicircular in shape and bounded on one side by a hole extending through said laminations.

5. The improvement defined in claim 1, wherein each of said at least one projection and recess together form an approximately parallel cross-sectional periphery in a section taken along said circle and form two approximately parallel edges which are approximately perpendicular to the plane of said laminations, said edges extending around a portion of said at least projection and recess; and wherein the corresponding edges of said recess and projection which are opposite said parallel edges form an angle with the plane of said lamination.

6. The improvement defined in claim 1, wherein said at least one projection and recess are shaped and arranged such that when said laminations are stacked they are centered and prevented from rotating about said common axis.

7. The improvement defined in claim 2, wherein said stamping die means includes at least one stamping die having a circular stamping surface, a section of said stamping surface being arranged parallel to the plane of one of said laminations and the remaining section of said stamping surface being beveled at a prescribed angle with respect to said plane when said die is stamped against said one lamination, in consequence of which said prescribed angle determines the angular degree of displacement of said laminations, when said laminations are stacked.

8. The improvement defined in claim 7, wherein said recess in said bottom die means is a circular hole passing through said bottom die means, said circular hole having a diameter which is approximately 15 percent larger than the diameter of said circular stamping surface of said at least one stamping die.

9. The improvement defined in claim 8, wherein said diameter of said circular stamping surface of said at least one stamping die is 2.6 mm.; wherein said diameter of said circular hole in said bottom die is 3.0 mm.; wherein the displacement in the angular direction between said at least one point of said recess of said bottom die means and said at least one point of said stamping means is 0.25 mm.; wherein said prescribed angle with which said remaining section of said circular surface is beveled is 28° and wherein each of said laminations is 0.5 mm. thick and has at least one opening, in consequence of which the stack of laminations has at least one slot which is inclined at an angle of 35° with respect to said common axis.

10. The improvement defined in claim 1, wherein said at least one projection and recess are formed at the same point, on each one of said plurality of laminations, around at least one circle.

11. The improvement defined in claim 1, wherein said at least one projection and recess of each lamination are formed such that only the corresponding edges of the projection and the recess of adjacent laminations are in engagement when said laminations are stacked, and wherein said step of welding said plurality of laminations together comprises discharging a capacitor through said stack of laminations.

12. The improvement defined in claim 1, wherein said plurality of laminations are rotor laminations and have an opening for a rotor shaft, said at least one projection and recess being stamped around said circle immediately adjacent to said opening.

13. The improvement defined in claim 1, wherein said plurality of laminations are stator laminations, said at least one projection and recess being stamped around said circle immediately adjacent to the outer circumference of said laminations.